United States Patent
Zhou et al.

(10) Patent No.: US 12,288,845 B2
(45) Date of Patent: Apr. 29, 2025

(54) PHOSPHORUS-FREE SULFIDE SOLID ELECTROLYTE

(71) Applicant: Ningde Amperex Technology Limited, Ningde (CN)

(72) Inventors: Molin Zhou, Ningde (CN); Feng Gu, Ningde (CN); Xin Jiang, Ningde (CN); Leimin Xu, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 619 days.

(21) Appl. No.: 17/708,180

(22) Filed: Mar. 30, 2022

(65) Prior Publication Data

US 2022/0223909 A1 Jul. 14, 2022

Related U.S. Application Data

(63) Continuation of application No. PCT/CN2019/124604, filed on Dec. 11, 2019.

(30) Foreign Application Priority Data

Nov. 1, 2019 (CN) .......................... 201911061250.5

(51) Int. Cl.
*H01M 10/0562* (2010.01)
*H01M 10/054* (2010.01)

(52) U.S. Cl.
CPC ..... *H01M 10/0562* (2013.01); *H01M 10/054* (2013.01); *H01M 2300/0068* (2013.01)

(58) Field of Classification Search
CPC ................................................. H01M 10/0562
See application file for complete search history.

(56) References Cited

U.S. PATENT DOCUMENTS

| 9,231,275 | B2 | 1/2016 | Lee et al. | |
| 9,748,602 | B2 | 8/2017 | Osaki et al. | |
| 10,158,142 | B1* | 12/2018 | Ling | ................. H01M 10/0525 |
| 11,050,081 | B2* | 6/2021 | Zhou | ................. H01M 10/0525 |
| 2018/0366769 | A1 | 12/2018 | Ling et al. | |
| 2020/0251772 | A1* | 8/2020 | Mo | ..................... H01M 10/052 |

FOREIGN PATENT DOCUMENTS

| CN | 1937301 A | 3/2007 |
| CN | 103288058 A | 9/2013 |
| CN | 103290478 A | 9/2013 |

(Continued)

OTHER PUBLICATIONS

Huang, W. et al. "Superionic lithium conductor with a cubic argyrodite-type structure in the Li—Al—Si—S system," Journal of Solid State Chemistry 270 (Dec. 13, 2018) 487-492.

(Continued)

*Primary Examiner* — Amanda C. Walke
(74) *Attorney, Agent, or Firm* — Maier & Maier, PLLC

(57) ABSTRACT

A solid electrolyte material having a general chemical formula of $Li_{2+x}M_{2+x}M'_{1-x}S_6$, where M is at least one of Al, Ga or In, M' is at least one of Si or Ge, and $0<x\leq0.5$. The solid electrolyte material according to the application is simple in composition, contains no phosphorus sensitive to water, and has good Li+ conductivity at the same time.

12 Claims, 6 Drawing Sheets

(56) References Cited

FOREIGN PATENT DOCUMENTS

| CN | 103290480 | A | | 9/2013 |
|---|---|---|---|---|
| CN | 104025363 | A | | 9/2014 |
| CN | 104185873 | A | | 12/2014 |
| CN | 104604013 | A | | 5/2015 |
| CN | 106684437 | A | | 5/2017 |
| CN | 107046149 | A | | 8/2017 |
| CN | 108352567 | A | | 7/2018 |
| CN | 109761265 | A | | 5/2019 |
| CN | 109841898 | A | | 6/2019 |
| JP | 2017142948 | A | | 8/2017 |
| JP | 6225859 | B2 | * | 11/2017 |
| KR | 20210039518 | A | * | 4/2021 |
| WO | 2014171483 | A1 | | 10/2014 |

OTHER PUBLICATIONS

He, X. et al. "Crystal Structural Framework of Lithium Super-Ionic Conductors," Advanced Energy Materials (Oct. 19, 2019) 2019, 9, 1902078.

International Search Report and Written Opinion for Application No. PCT/CN2019/124604, mailed on Aug. 5, 2020, 8 pages.

First Official Action in Chinese Application 201911061250.5, dated Aug. 3, 2020, 19 pages.

Notice of Allowance in Chinese Application 201911061250.5, dated Oct. 28, 2020, 4 pages.

Japanese Office Action (Notice of Reasons for Refusal), dated Aug. 22, 2023, corresponding to JP Application No. 2022-525919.

European Search Report, dated Dec. 2, 2022, corresponding to EP Application No. 19950266.7.

Chinese Office Action (Notification to Grant Patent Right for Invention), dated Oct. 28, 2020, corresponding to CN Application No. 201911061250.5.

Murayama, Masahiro et al: "Synthesis of New Lithium Ionic Conductor Thio-LISICON-Lithium Silicon Sulfides System", Journal of Solid State Chemistry, vol. 168, No. 1, Oct. 31, 2002, pp. 140-148, XP055723686.

Wenze Huang, et al: "Superionic lithium conductor with a cubic argyrodite-type structure in the Li—Al—Si—S system", Journal of Solid State Chemistry, vol. 270, Dec. 13, 2018, pp. 487-492, XP085585033.

* cited by examiner

Density of electronic states

Ionic migration barrier

PHOSPHORUS-FREE SULFIDE SOLID ELECTROLYTE

CROSS REFERENCE TO THE RELATED APPLICATIONS

The application is a Continuation of PCT/CN2019/124604 filed on Dec. 11, 2019 which claims the benefit of priority from Chinese patent application 201911061250.5 filed on Nov. 1, 2019, the disclosure of which is hereby incorporated by reference in its entirety.

TECHNICAL FIELD

The invention relates to a phosphorus-free sulfide solid electrolyte.

BACKGROUND

As the electronic technique rapidly develops, electronic equipment such as phones, notebook computers, vidicon and electric tools increases, and people's demand for energy storage power is getting higher. It is urgent to develop secondary batteries with high capacity, long life, and good safety performance. In contrast with lead-acid, nickel-cadmium, nickel-hydrogen batteries, or the like, lithium-ion batteries are characterized in high energy density, high power density, long life, good safety, low self-discharge rate, and wide temperature adaptation range, thereby being most widely used. However, it is required to use a flammable organic solution as an electrolyte for traditional lithium-ion batteries, so a great potential safety hazard exists. Particularly, for lithium-ion batteries with higher energy density, although measures can be taken to improve material, electrode, cell, module, power management, heat management, systematic design, or the like, battery safety still remains prominent and it is hard to completely avoid thermal runaway. In recent years, vicious battery explosion accidents sometimes happen. Therefore, it is especially important to explore lithium-ion secondary batteries with good safety performance.

In order to solve the above safety problem fundamentally, it is a good scheme to replace an organic electrolyte solution with a solid electrolyte. The solid electrolyte is incombustible, non-volatile, and free from corrosion and liquid leakage, therefore, an all-solid-state battery assembled with the solid electrolyte has extremely high safety. In addition, an all-solid-state battery is characterized in long life and high theoretical energy density. During the use of lithium-ion batteries with the organic electrolyte solution, since an SEI film gets broken and is generated repeatedly during the cyclic process, resulting in accelerating the degradation of battery capacity, and lots of side effects during the cyclic process also have a severe impact on the service life of batteries, the solid electrolyte can solve this problem. In another aspect, most of the solid electrolytes are featured with good mechanical strength and can inhibit lithium dendrites effectively. This can also significantly improve the cycle performance and service life of batteries. In addition, since the solid electrolyte generally has a wide electrochemical window, it can match with more high-voltage positive electrodes; moreover, the all-solid-state battery can greatly simplify the battery thermal management system and can greatly improve the energy density.

In recent years, researchers have conducted a lot of exploratory work on the solid electrolyte. In summary, there are three types of common solid electrolytes at present: polymer-type, oxide-type and sulfide-type. The concept of polymer solid electrolyte was firstly put forward by Armand in 1978. The polymer solid electrolyte includes a polymer and a lithium salt. Lithium ions and polar groups in a polymer chain are complexing with each other. Under the action of an external electric field, the flexibility of the polymer chain is used for the directional migration of lithium ions. Common polymer solid electrolytes include PEO-based, PPO-based, PAN-based, PMMA-based, and PVDF-based electrolytes, or the like. These kinds of electrolytes have light mass, good viscoelasticity, and good mechanical processability, but very low ionic conductivity has a severe impact on the high-rate charge and discharge capacity of batteries. Chemical copolymerization, grafting, or the like are usually used to reduce the crystallinity of a polymer matrix and improve the ionic conductivity, but improved room temperature ionic conductivity is still very low. Oxide solid electrolytes include Perovskite-type (e.g., $Li_{3x}La_{2/3-x}TiO_3$), Anti-Perovskite-type (e.g., $Li_3OCl$), NASICON-type (e.g., $Li_{1+x}Al_xTi_{2-x}(PO_4)_3$), Garnet-type (e.g., $Li_7La_3Zr_2O_{12}$) electrolytes, or the like. These kinds of electrolytes generally have good chemical stability and can exist in the air stably, but the ionic conductivity is relatively low, the grain boundary resistance is great, and the compatibility with an electrode is poor. Compared with two types of solid electrolytes aforesaid, the sulfide solid electrolyte is characterized in high ionic conductivity, low grain boundary resistance, good electrochemical stability, or the like, receives wide attention from researchers, and is the material that is most promising for scale application. In the sulfide materials, $Li_2S$—$SiS_2$ system is a type of solid electrolyte that is first studied. It is reported that (Hayashi et al., "Characterization of $Li_2S$—$SiS_2$-$Li_3MO_3$ M=B, Al, Ga and In) oxysulfide glasses and their application to solid state lithium secondary batteries", 2002, Solid State Ionics, Volume 152-153, Pages 285-290): $Li_3PO_4$, $LiSiO_4$, $Li_3BO_3$, and $Li_3AlO_3$ with glassy-state $Li_2S$—$SiS_2$ can significantly improve the conductivity and inhibit crystallization of materials. In 2001, Tatsumisago, et al. (Tatsumisago et al., "Solid state lithium secondary batteries using an amorphous solid electrolyte in the system $(100-x)(0.6Li_2S-0.4SiS_2).xLi_4SiO_4$ obtained by mechanochemical synthesis", 2001, Solid State Ionics, Volume 140, Pages 83-87) used mechanical ball milling instead of melt quenching to prepare a glassy-state solid electrolyte $(100-x)(0.6Li_2S-0.4SiS_2).xLi_4SiO_4$, and exhaustively discussed the impact of milling time on the formation of a glassy state and the performance of all-solid-state batteries. Subsequently, Tatsumisago, et al. (Tatsumisago et al., "New, Highly Ion-Conductive Crystals Precipitated from $Li_2S$—$P_2S_5$ Glasses", 2005, Advanced Materials, Volume 17, Pages 918-921) reported for the first time in 2005 the preparation of sulfur phosphorus compound material $70Li_2S-30P_2S_5$ by energetic ball milling, with the room temperature ionic conductivity up to $3.2 \times 10^{-3}$ S/cm, thereby starting a trend of preparing glass-ceramic sulfur phosphorus compound materials by energetic ball milling. In 2011, Tokyo Institute of Technology and Toyota Motor Corporation made a breakthrough (Kamaya et al., "A lithium superionic conductor", 2011, Nature Materials, Volume 10, Pages 682-686). They jointly reported a crystal sulfur phosphide electrolyte with a lithium-ion three-dimensional diffusion channel, $Li_{10}GeP_2Si_2$ (LGPS), on nature materials, a top international journal of materials science. The room temperature ionic conductivity reaches $1.2 \times 10^{-2}$ S/cm, which even can be comparable to the ionic conductivity of common carbonate electrolyte solution, thereby further attracting global attention to sulfur phosphorus compound materials. However, in another aspect, sulfur phosphorus compounds are generally sensitive to water in the air, and can easily generate malodorous $H_2S$ gas due to water absorption during the processing in a conventional environment. The gas is harmful to the environment and processing personnel. According to the Hard-Soft Acid-Base theory, $P^{5+}$ in the sulfur phosphorus compounds is hard acid, and compared with $S^{2-}$, $O^{2-}$ in water is harder base. Hard acid reacts with hard base firstly, thus sulfides with phosphorus may deteriorate easily when they absorb water. In view of this, exploration of some novel sulfide solid electrolyte materials with good Li+ conductivity and without phosphorus is of great importance.

SUMMARY

The application provides a novel sulfide solid electrolyte material and an electrochemical device comprising the solid electrolyte material. The solid electrolyte material is simple in composition, contains no phosphorus sensitive to water, and has good $Li^+$ conductivity at the same time. It is a promising solid electrolyte material.

A first purpose of the application is to disclose a novel sulfide solid electrolyte material.

A second purpose of the application is to disclose the crystallographic characteristics, structural information, XRD spectrogram, PBE band gap, $Li^+$ migration path, and migration barrier of the solid electrolyte material.

Specifically, the application discloses a novel sulfide solid electrolyte material, represented by a general chemical formula $Li_{2+x}M^{2+x}M'_{1-x}S_6$, wherein M is at least one of Al, Ga or In, M' is at least one of Si or Ge, and $0<x \le 0.5$.

First, the $Li_{2+x}M_{2+x}M'_{1-x}S_6$ material has diamond-like structural characteristics. In the structure, coordination of $M^{3+}$ (e.g., $Al^{3+}$) and $M'^{4+}$ (e.g., $Si^{4+}$) with $S^{2-}$ forms tetrahedrons. All connected corner-sharing tetrahedrons form a three-dimensional network, and $Li^+$ is filled in the gap between tetrahedrons.

Next, the application discloses XRD spectrogram characteristics of $Li_{2+x}M_{2+x}M'_{1-x}S_6$. In an XRD spectrogram, strong diffraction peaks may occur at about 14.5°±3°, 15.5°±3°, 17°±3°, 25.5°±3°, 31.5°±3°, 53.0°±3°, or the like.

Then, by taking $Li_{2+x}Al_{2+x}Si_{1-x}S_6$ as a demonstrative example and using VASP software (Hafner research group of University of Vienna, Vienna Ab-initio Simulation Package) for calculation, a PBE band gap of the $Li_{2+x}Al_{2+x}Si_{1-x}S_6$ material is no less than 2.8 eV. It is well-known that exchange-correlation functional in the form of PBE may severely underestimate the optical band gap of insulators and semiconductors (refer to the patent document, publication number: CN106684437A), and the intrinsic band gap of the $Li_{2+x}Al_{2+x}Si_{1-x}S_6$ material should be far beyond 2.8 eV. In 2012, Yin Wenlong, et al. (Yin et al., "Synthesis, Structure, and Properties of $Li_2In_2MQ_6$ (M=Si, Ge; Q=S, Se): A New Series of IR Nonlinear Optical Materials", 2012, Inorganic Chemistry, Volume 51, Pages 5839-5843) firstly reported the experimental band gap of $Li_2In_2SiS_6$ is about 3.61 eV. In the application, $Li_2In_2SiS_6$ is calculated with the same parameters, and the PBE band gap is 2.08 eV. It can be seen from this that the intrinsic band gap of $Li_{2+x}Al_{2+x}Si_{1-x}S_6$ should exceed about 4.3 eV.

Finally, by taking $Li_{2+x}Al_{2+x}Si_{1-x}S_6$ as an example, the application exhaustively evaluates lithium-ion migration paths and migration barriers of $Li_{2.125}Al_{2.125}Si_{0.875}S_6$, $Li_{2.25}Al_{2.25}Si_{0.75}S_6$, and $Li_{2.5}Al_{2.5}Si_{0.5}S_6$.

Compared with the prior art, the invention has the following beneficial effects:

The invention provides a novel sulfide solid electrolyte material $Li_{2+x}M_{2+x}M'_{1-x}S_6$, with a diamond-like structure, where coordination of $M^{3+}$ and $M'^{4+}$ with four $S^{2-}$ forms $[MS_4]$ and $[M'S_4]$ tetrahedrons. All corner-sharing tetrahedrons are connected, and $Li^+$ is filled in the gap between tetrahedrons.

This kind of material has a wide optical band gap. Particularly, for the $Li_{2+x}Al_{2+x}Si_{1-x}S_6$ material, the intrinsic band gap is no less than about 4.3 eV, and $Li^+$ migration barrier is no greater than 0.45 eV. Overall, this kind of material has a wide band gap and a low $Li^+$ conduction barrier, indicating that it has strong $Li^+$ conducting power and is a novel fast lithium-ion conductor material, with a good application prospect.

More importantly, compared with sulfur phosphorus family solid electrolytes, according to the Hard-Soft Acid-Base theory, this kind of material does not contain hard acid $P^{5+}$ and should have good stability. At the same time, it can be seen from the structure that all tetrahedrons are corner-sharing connected, groups are arranged compactly with a little gap, and the structural stability is good.

In some embodiments, the general chemical formula of the solid electrolyte material is $Li_{2+x}M_{2+x}M'_{1-x}S_6$, wherein M is at least one of Ga or In, M' is at least one of Si or Ge, and $0<x \le 0.5$.

In some embodiments, the general chemical formula of the solid electrolyte material is $Li_{2+x}Al_{2+x}Si_{1-x}S_6$, wherein $0<x \le 0.5$.

In some embodiments, lattice parameters of the solid electrolyte material are about a=13.0±2.0 Å, b=8.0±2.0 Å, c=13.0±2.0 Å, α=90.0°±5°, β=110.0°±10°, and γ=90.0°±5°.

In some embodiments, lattice parameters of the solid electrolyte material are about a=12.0±1.0 Å, b=7.0±1.0 Å, c=12.0±1.0 Å, α=90.0°±5°, β=105°±5°, and γ=90.0°±5°.

In some embodiments, coordination of $M^{3+}$ ($Al^{3+}$) and $M'^{4+}$ ($Si^{4+}$) in the solid electrolyte material structure with $S^{2-}$ forms $[MS_4]$ ($[AlS_4]$) and $[M'S_4]$ ($[SiS_4]$). All corner-sharing tetrahedrons are connected, and $Li^+$ is filled in the gap between tetrahedrons.

In some embodiments, strong diffraction peaks may occur at about 14.5°±3°, 15.5°±3°, 17°±3°, 25.5°±3°, 31.5°±3°, 53.0°±3°, or the like in XRD spectrogram of the solid electrolyte material.

In some embodiments, $Li^+$ migration barrier of the solid electrolyte material is no greater than about 0.45 eV.

In some embodiments, the PBE band gap of the solid electrolyte material is no less than about 2.80 eV.

Unprecedented attention is paid to the safety of batteries. The solid electrolyte material can replace the organic electrolyte solution and is applied to novel lithium-ion batteries. The safety risks arising from thermal runaway are thermal runaways in principle. The invention provides a type of novel sulfide solid electrolyte, with great application potential. The solution is of high innovation and practical value, and can promote the further application of sulfide solid electrolyte.

DETAILED DESCRIPTION

Exemplary embodiments of the invention will be described below by reference to the figures. The exemplary embodiments are the interpretation of the invention, instead of limiting the scope of protection of the claims of the invention. The scope of the invention is only defined by the claims attached and equivalents thereof.

I. Solid Electrolyte Material

In general, inorganic solid electrolyte material usually comprises a stable ion skeleton and a moveable ion (e.g., $Li^+$). Compared with oxide solid electrolytes, the ionic radius of $S^{2-}$ in the sulfide solid electrolytes is much greater than $O^{2-}$, enabling a much larger movable space for $Li^+$ between skeletons; at the same time, the nucleus of $S^{2-}$ has a lower constraint to the ambient electron cloud, making that the electron cloud is more easily polarized and the charge distribution may cooperate with $Li^+$ more easily during the movement of $Li^+$ to form deformation and reduce the force on lithium-ion, thereby reducing the migration barrier of $Li^+$. On the basis of fully understanding the structural characteristics of sulfide, by replacing with congeners, using part of $M^3$ instead of $M'^{4+}$, and introducing the thinking of gap $Li^+$, the inventor finds a novel sulfide solid electrolyte, $Li_{2+x}M_{2+x}M'_{1-x}S_6$. This kind of material does not contain phosphorus, and has a low $Li^+$ migration barrier, with great application potential.

The embodiments of the application provide a solid electrolyte material. The general chemical formula of the material is $Li_{2+x}M_{2+x}M'_{1-x}S_6$, wherein M is at least one of Al, Ga or In, M' is at least one of Si or Ge, and $0<x\leq0.5$.

1. Structural Characteristics

The application firstly discloses the structural characteristics of the $Li_{2+x}M_{2+x}M'_{1-x}S_6$ material, which has diamond-like structural characteristics. Lattice parameters are around a=13.0±2.0 Å, b=8.0±2.0 Å, c=13.0±2.0 Å, α=90.0°±5°, β=110.0°±10°, and γ=90.0°±5°. For the $Li_{2+x}Al_{2+x}Si_{1-x}S_6$ in the application, lattice parameters are about a=12.0±1.0 Å, b=7.0±1.0 Å, c=12.0±1.0 Å, α=90.0°±5°, β=105°±5°, and γ=90.0°±5°. Specifically, for a $Li_{2.125}Al_{2.125}Si_{0.875}S_6$ material, lattice parameters are about a=11.7, b=7.2, c=11.6, α=90.3°, β=107.9°, and γ=89.7°; for a $Li_{2.25}Al_{2.25}Si_{0.75}S_6$ material, lattice parameters are about a=11.7, b=7.3, c=11.7, α=89.7°, β=107.5°, and γ=90.1°; for a $Li_{2.5}Al_{2.5}Si_{0.5}S_6$ material, lattice parameters are about a=12.0, b=7.6, c=11.8, α=88.5°, β=102.9°, and γ=90.2°. In the structure, coordination of $M^3$ and $M^{'4}$ with four $S^{2-}$ forms tetrahedrons. All connected corner-sharing tetrahedrons form a three-dimensional network, and $Li^+$ is filled in the gap between tetrahedrons. It can be seen from the composition and structural characteristics of elements that $Li_{2+x}M_{2+x}M'_{1-x}S_6$ has good stability.

2. XRD Spectrogram

Figure 2:
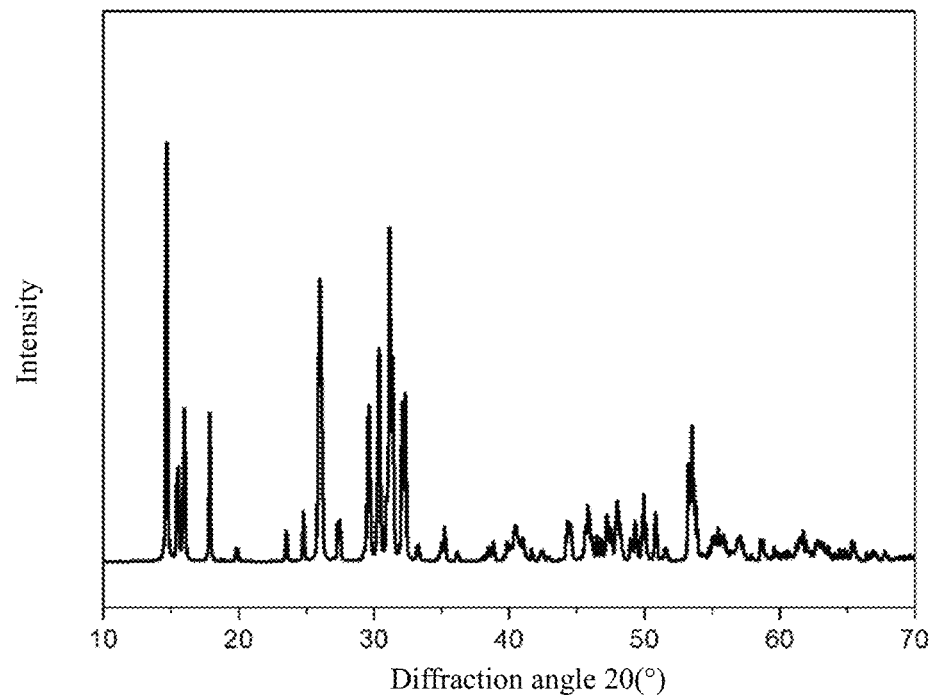
FIG. 2 illustrates an XRD spectrogram of $Li_{2.125}Al_{2.125}Si_{0.875}S_6$.
Figure 6:
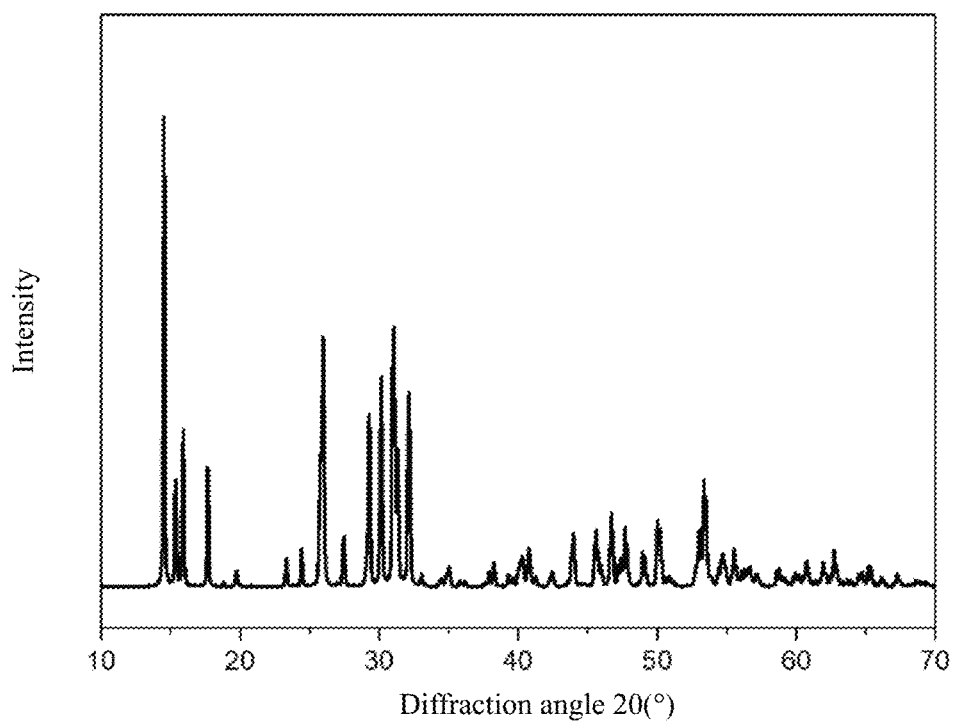
FIG. 6 illustrates an XRD spectrogram of $Li_{2.25}Al_{2.25}Si_{0.75}S_6$.
Figure 10:
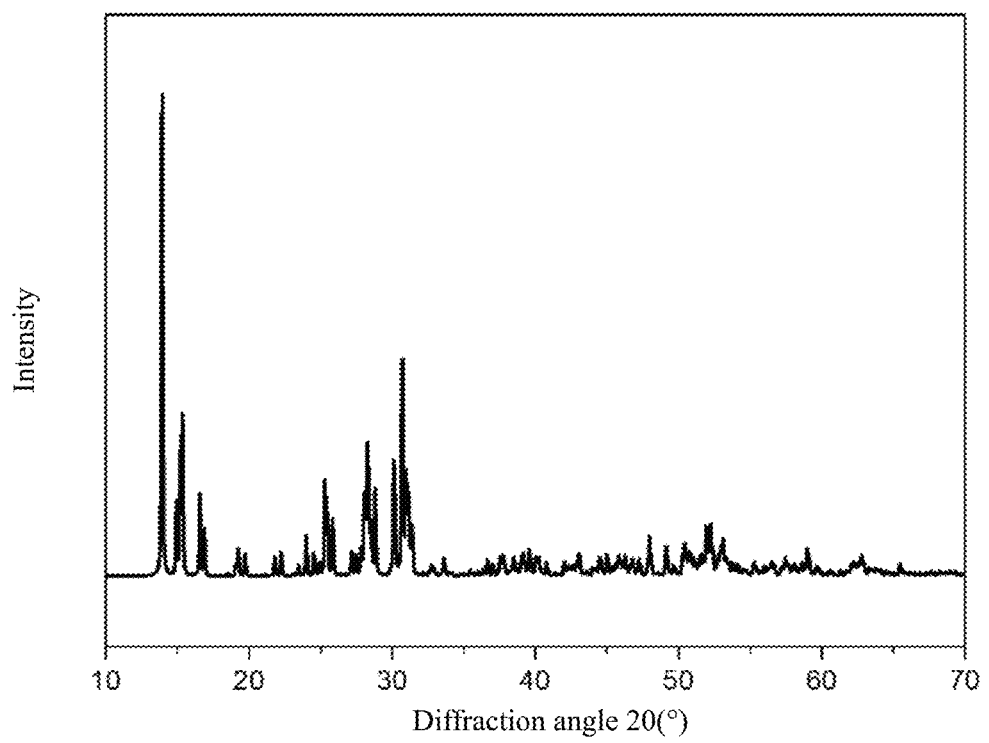
FIG. 10 illustrates an XRD spectrogram of $Li_{2.5}Al_{2.5}Si_{0.5}S_6$.

The application also discloses characteristics of an XRD spectrogram of the $Li_{2+x}M_{2+x}M'_{1-x}S_6$ material. As shown in FIGS. 2, 6 and 10, in the XRD spectrogram, strong diffraction peaks may occur at about 14.5°±3°, 15.5°±3°, 17°±3°, 25.5°±3°, 31.5°±3°, 53.0°±3°, or the like. Specifically, for the $Li_{2.125}Al_{2.125}Si_{0.875}S_6$ material, strong diffraction peaks may occur at about 14.60, 16.00, 18.00, 26.00, 31.30, and 53.5°; for the $Li_{2.25}Al_{2.25}Si_{0.75}S_6$ material, strong diffraction peaks may occur at about 14.60, 16.00, 17.70, 26.00, 31.10, and 53.40; for the $Li_{2.5}Al_{2.5}Si_{0.5}S_6$ material, strong diffraction peaks may occur at about 14.0°, 15.4°, 16.8°, 25.4°, 30.8°, and 52.1°.

3. Lithium-Ion Transport Characteristics

Figure 3:
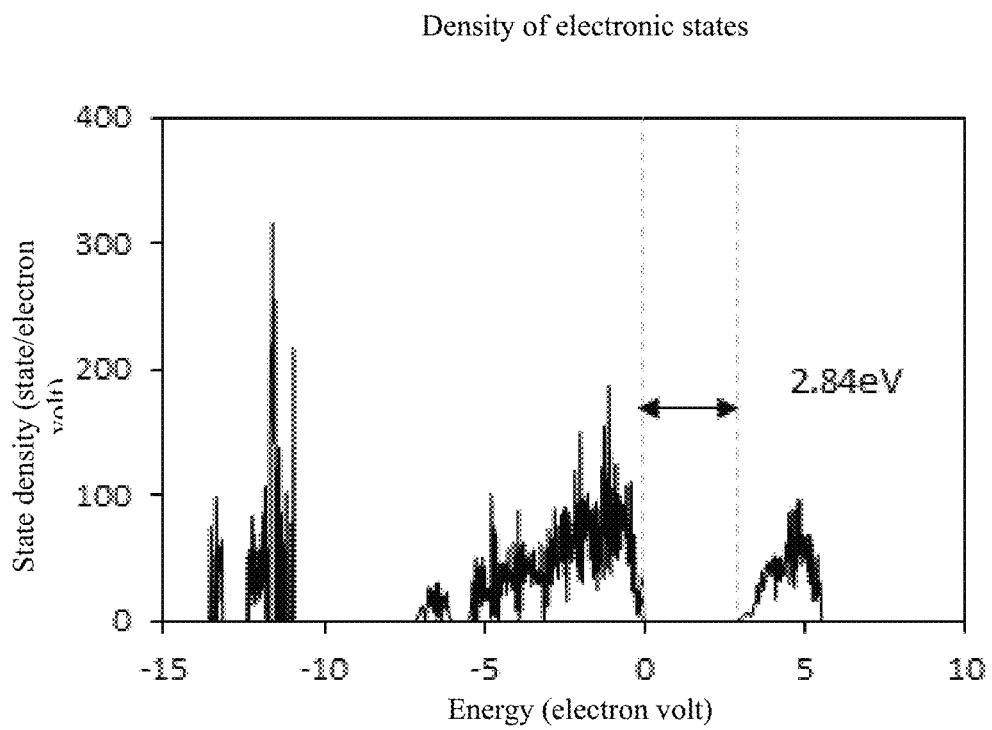
FIG. 3 illustrates a state density of $Li_{2.125}Al_{2.125}Si_{0.875}S_6$.
Figure 7:
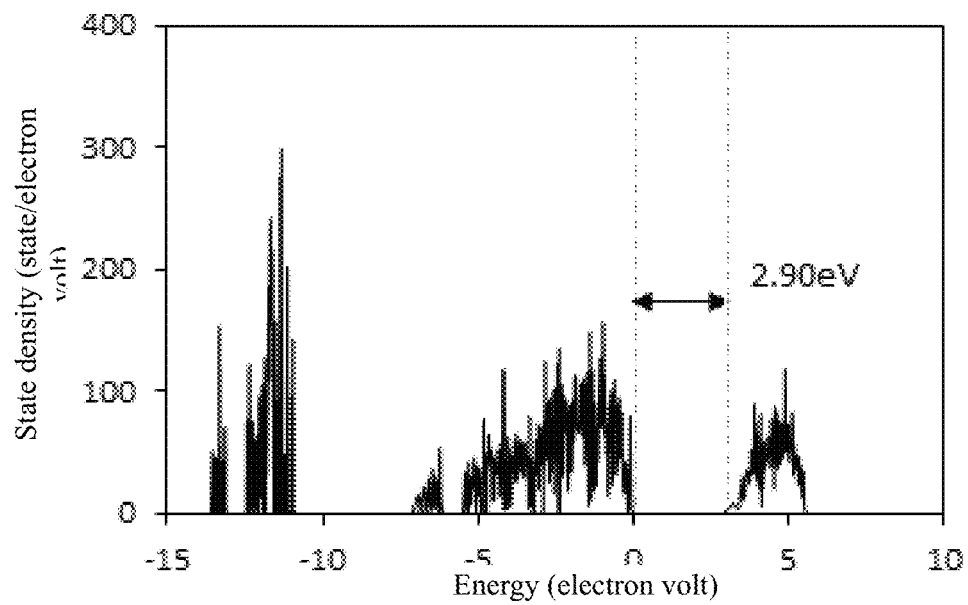
FIG. 7 illustrates a state density of $Li_{2.25}Al_{2.25}Si_{0.75}S_6$.
Figure 11:
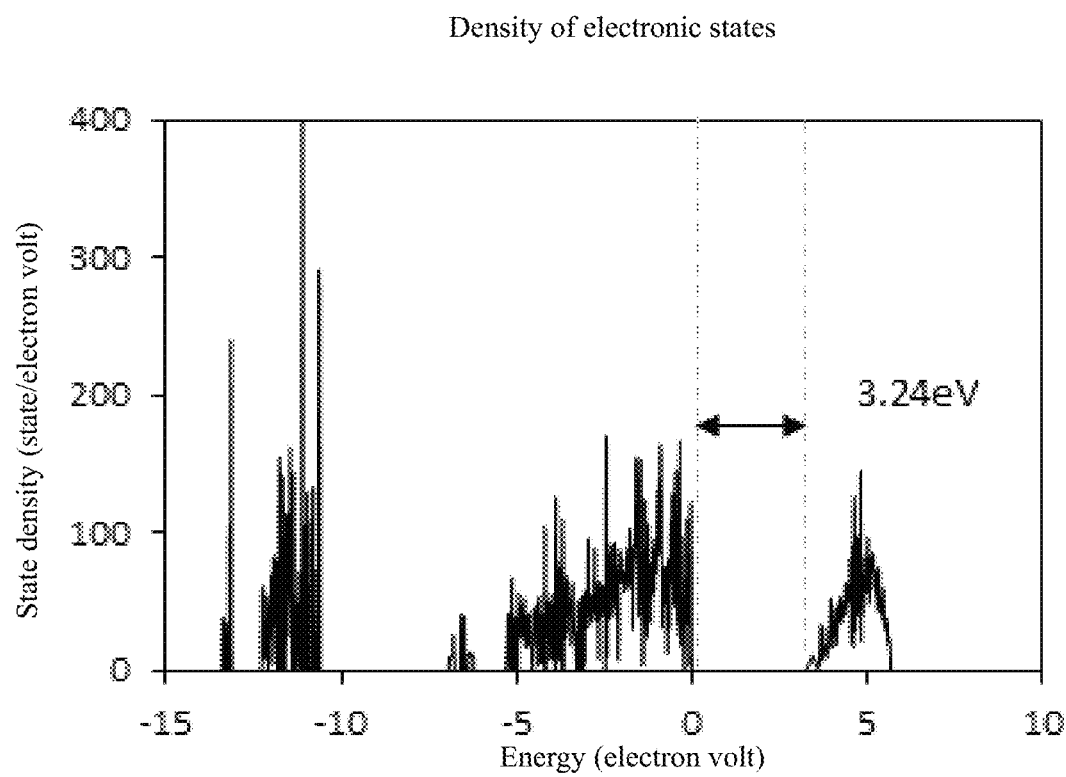
FIG. 11 illustrates a state density of $Li_{2.5}Al_{2.5}Si_{0.5}S_6$.

Materials that can be used as solid electrolytes must meet the conditions of electronic insulation and ionic conductivity. It is well-known that electronic insulation is greatly related to the optical band gap of materials. Therefore, the invention uses PBE exchange-correlation functional for calculating the total density of states of several $Li_{2+x}M_{2+x}M'_{1-x}S_6$ materials (taking $Li_{2.125}Al_{2.125}Si_{0.875}S_6$, $Li_{2.25}Al_{2.25}Si_{0.75}S_6$, and $Li_{2.5}Al_{2.5}Si_{0.5}S_6$ as demonstrative examples). As shown in FIGS. 3, 7, and 11, the PBE band gap of the $Li_{2+x}Al_{2+x}Si_{1-x}S_6$ material is no less than 2.80 eV. It is well-known that exchange-correlation functional in the form of PBE may severely underestimate the optical band gap of insulators and semiconductors (refer to the patent document, publication number: CN106684437A), and the intrinsic band gap of the $Li_{2+x}Al_{2+x}Si_{1-x}S_6$ material should be far beyond 2.8 eV. In 2012, Yin Wenlong, et al. (Yin et al., "Synthesis, Structure, and Properties of $Li_2In_2MQ_6$ (M=Si, Ge; Q=S, Se): A New Series of IR Nonlinear Optical Materials", 2012, Inorganic Chemistry, Volume 51, Pages 5839-5843) firstly reported the experimental band gap of $Li_2In_2SiS_6$ is about 3.61 eV. In the invention, $Li_2In_2SiS_6$ is calculated with the same parameters, and the PBE band gap is 2.08 eV. It can be seen from this that the intrinsic band gap of $Li_{2+x}Al_{2+x}Si_{1-x}S_6$ should exceed about 4.3 eV. It is an insulator with a wide energy gap, and is characterized in electrical insulation. Wide energy gap width also indicates the low bonding-state energy, i.e., high oxidation potential, and indicates that the structure has a wide electrochemical window at the same time, conducive to match with high-voltage positive electrode materials.

Lithium-ion transport characteristics are the most critical characteristics of solid electrolytes. Therefore, the inventor calculates $Li^+$ migration path and migration barrier of the $Li_{2+x}M_{2+x}M'_{1-x}S_6$ material by using First Principle and VASP software (Hafner research group of University of Vienna, Vienna Ab-initio Simulation Package).

It's understandable that in the $Li_{2+x}M_{2+x}M'_{1-x}S_6$ material, M and M' can be arbitrarily selected from Al, Ga, In and Si, Ge respectively. In order to describe clearly and simply, the invention takes $Li_{2+x}Al_{2+x}Si_{1-x}S_6$ as an example to discuss, and exhaustively calculates $Li^+$ migration path and migration barrier of $Li_{2.125}Al_{2.125}Si_{0.875}S_6$, $Li_{2.25}Al_{2.25}Si_{0.75}S_6$, $Li_{2.5}Al_{2.5}Si_{0.5}S_6$, or the like.

Figure 1:
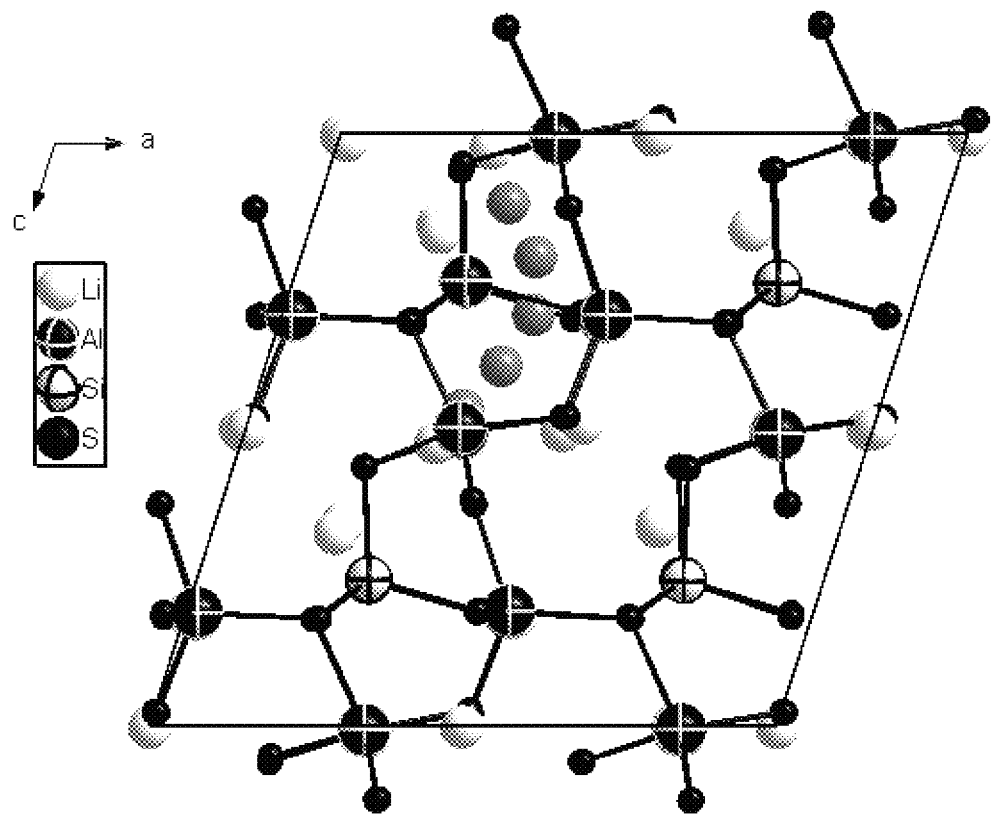
FIG. 1 illustrates a lattice structure and a $Li^+$ migration path of $Li_{2.125}Al_{2.125}Si_{0.875}S_6$.
Figure 4:
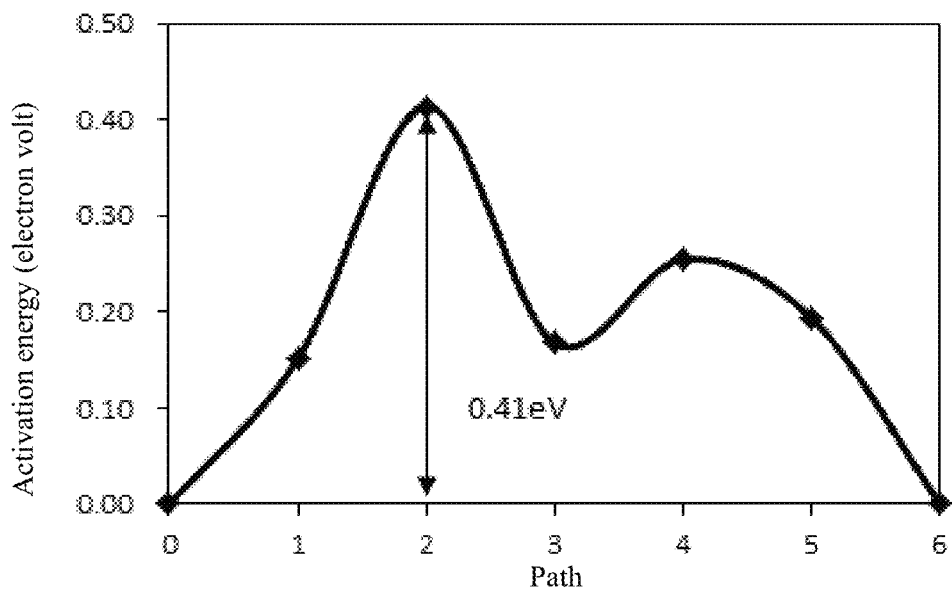
FIG. 4 illustrates a gap $Li^+$ migration barrier of $Li_{2.125}Al_{2.125}Si_{0.875}S_6$.
Figure 5:
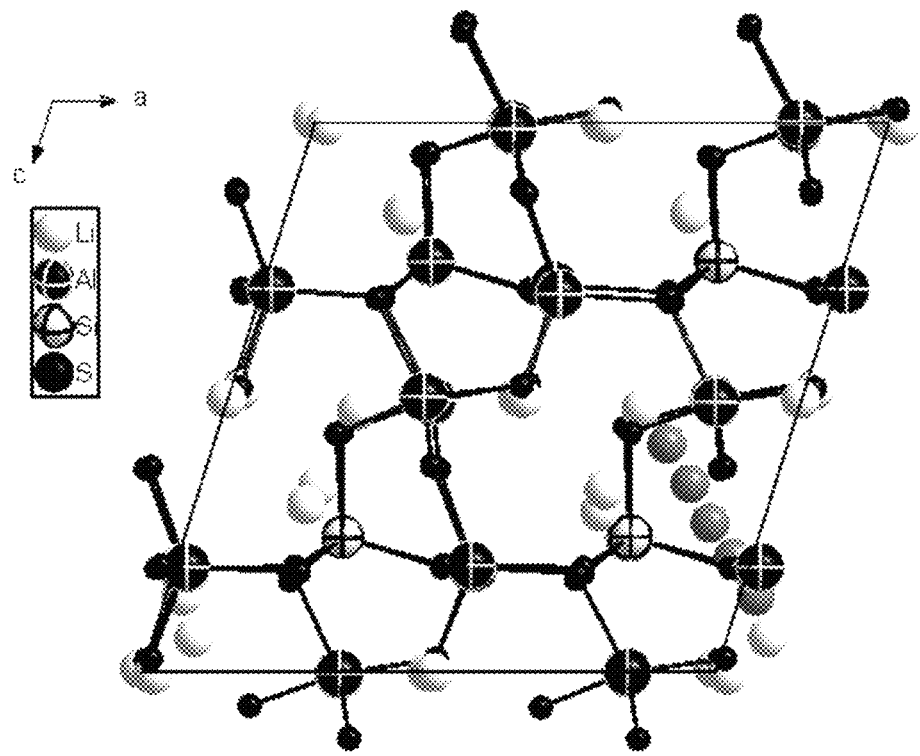
FIG. 5 illustrates a lattice structure and a $Li^+$ migration path of $Li_{2.25}Al_{2.25}Si_{0.75}S_6$.
Figure 8:
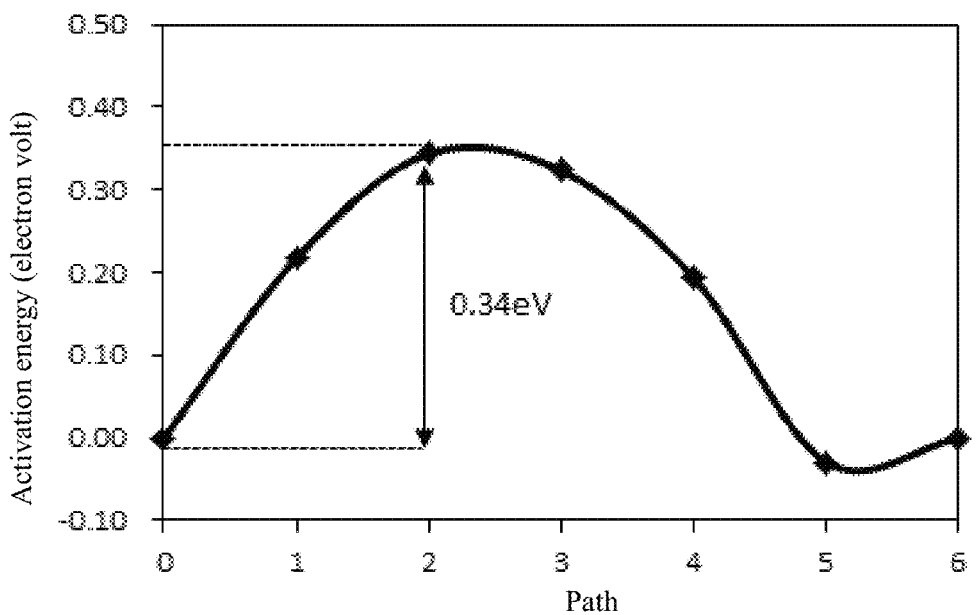
FIG. 8 illustrates a gap $Li^+$ migration barrier of $Li_{2.25}Al_{2.25}Si_{0.75}S_6$.
Figure 9:
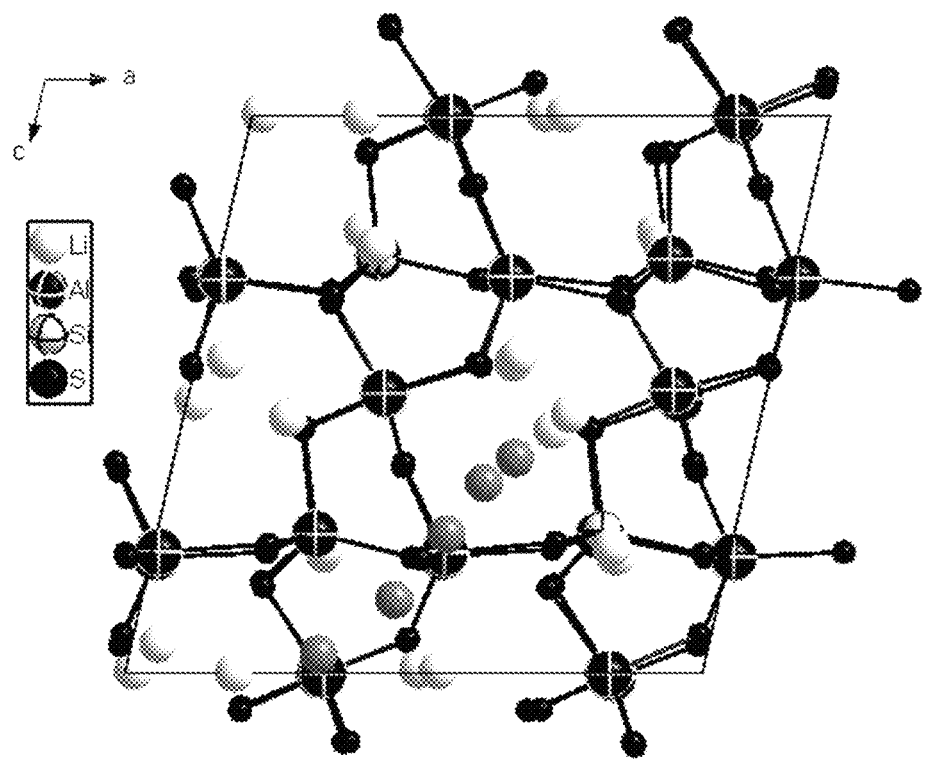
FIG. 9 illustrates a lattice structure and a $Li^+$ migration path of $Li_{2.5}Al_{2.5}Si_{0.5}S_6$.
Figure 12:
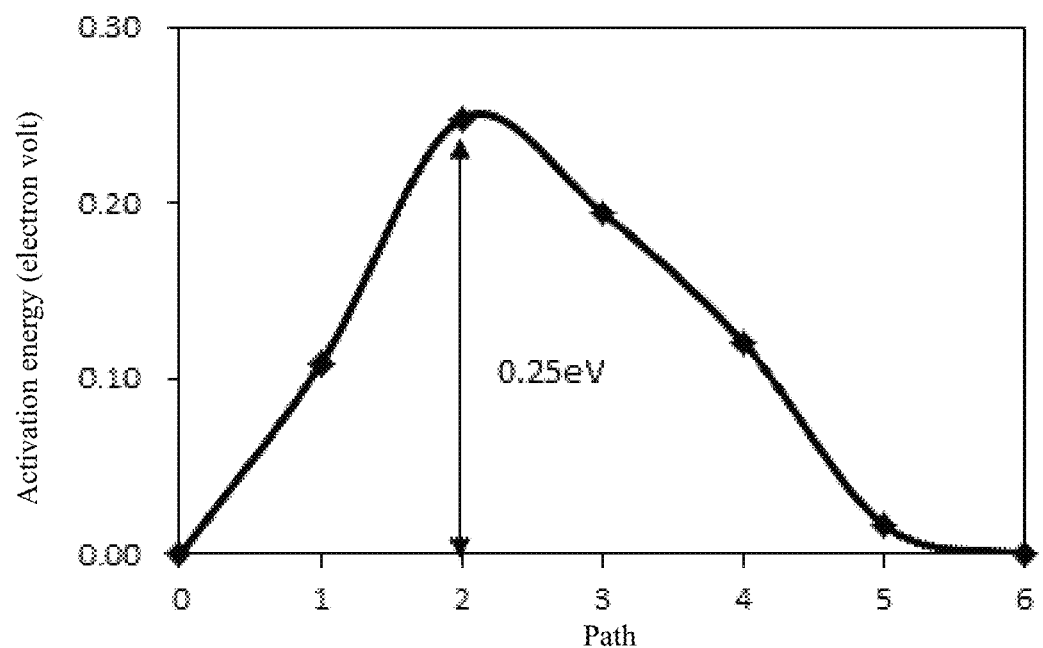
FIG. 12 illustrates a gap $Li^+$ migration barrier of $Li_{2.5}Al_{2.5}Si_{0.5}S_6$.

FIGS. 1, 5, and 9 illustrate $Li^+$ migration paths of the $Li_{2+x}Al_{2+x}Si_{1-x}S_6$ material, wherein gray $Li^+$ ion is at a transition position artificially inserted between the initial state and the final state, and $Li^+$ transits from the initial state to the final state via the intermediate state. FIGS. 4, 8, and 12 illustrate the migration barrier shape of lowest activation energy in these migration channels through the further calculation of transition state. Specifically, the interstitial lithium-ion pushes the lattice lithium-ion to the next gap site and occupies a lattice site, enabling Li$^+$ transport by the means of "interstitialcy". For $Li_{2.125}Al_{2.125}Si_{0.875}S_6$, $Li_{2.25}Al_{2.25}Si_{0.75}S_6$, and $Li_{2.5}Al_{2.5}Si_{0.5}S_6$, the migration barrier is about 0.41, 0.34, and 0.25 eV respectively. As a contrast, it is reported in the document (Ceder et al., "First principles study of the $Li_{10}GeP_2S_{12}$ lithium super ionic conductor material", 2012, Chemistry of Materials, Volume 24, Pages 15-17. Mo et al., "Origin of fast ion diffusion in super-ionic conductors", 2017, Nature Communications, Volume 8, Pages 15893.) that Li$^+$ migration barrier of LGPS material (benchmark material in sulfide solid electrolyte) is about 0.2 eV. It can be seen from this that Li$^+$ in a lattice structure of the $Li_{2.5}Al_{2.5}Si_{0.5}S_6$ material can diffuse easily, and this material is a good potential solid electrolyte material.

It can be seen from the embodiments above that the $Li_{2+x}M_{2+x}M'_{1-x}S_6$ material disclosed by the invention does not contain phosphorus, and is characterized in improved chemical stability, wide optical band gap (wide electrochemical window), and good Li$^+$ transport capability, thereby having great application potential.

II. Electrochemical Device

The electrochemical device according to the application includes any device that generates an electrochemical reaction, and specific examples include all kinds of primary batteries, secondary batteries, fuel batteries, solar batteries, or capacitors. Particularly, the electrochemical device is a lithium secondary battery, including a lithium metal secondary battery or a lithium-ion secondary battery. In some embodiments, the electrochemical device according to the application includes a positive electrode, a negative electrode, and the solid electrolyte of the application.

III. Application

The electrochemical devices manufactured according to the application are applicable to electronic equipment in various fields.

The electrochemical device according to the application is not particularly limited in the purpose, and can be used for any purpose known in the prior art. In one embodiment, the electrochemical device according to the application can be used for, including but not limited to notebook computers, pen-type computers, mobile computers, e-book players, portable phones, portable fax machines, portable copiers, portable printers, head-mounted stereo headsets, video recorders, liquid crystal TVs, portable cleaners, portable CD players, mini disks, transceivers, electronic notebooks, calculators, memory cards, portable recorders, radios, standby power supplies, motors, automobiles, motorcycles, power-assisted bicycles, bicycles, lighting appliances, toys, game machines, clocks, electric tools, flashlights, cameras, large household batteries, and lithium-ion capacitors.

EMBODIMENTS

The description below is the performance evaluation according to the embodiments of the application.

1. Preparation and Performance Evaluation of Solid Electrolyte Materials

The $Li_{2+x}M_{2+x}M'_{1-x}S_6$ material disclosed by the invention can be prepared by many conventional methods. For instance, $Li_2O$, $M_2O_3$, and $M'O_2$ can be used as raw materials. They are mixed evenly according to the required molar ratio, ground into the uniform powder by ball milling under the protection of the inert atmosphere, and sintered by the high-temperature solid-state method under the inert atmosphere or vacuum. It can be understood that other preparation means can be selected, e.g., melt quenching. Certainly, appropriate target materials can also be selected, and the solid electrolyte material is prepared by physical or chemical vapor deposition. The expected element molar ratio can be obtained by deposition by adjusting relevant process parameters. Since these preparation processes are familiar to those skilled in the art, they will not be repeated here.

2. Manufacturing of the Electrochemical Device

Some embodiments of the invention also provide a secondary battery, which can be a lithium-ion battery or a lithium metal battery. In the secondary battery, the $Li_{2+x}M_{2+x}M'_{1-x}S_6$ material described in the aforesaid embodiments of the invention can be used. Since the structure of the solid secondary battery is familiar to those skilled in the art, it will not be repeated here.

The embodiments above are demonstrative implementations of the invention. The implementations of the invention are not limited by the embodiments above. The scope of the invention is only defined by the claims attached and equivalents thereof.

What is claimed is:

1. A solid electrolyte material, wherein a general chemical formula of the material is $Li_{2+x}M_{2+x}M'_{1-x}S_6$, where M is at least one of Al, Ga or In, M' is at least one of Si or Ge, and $0<x\leq0.5$.

2. The solid electrolyte material according to claim 1, wherein M is Al and M' is Si.

3. The solid electrolyte material according to claim 1, wherein lattice parameters thereof are about a=13.0±2.0 Å, b=8.0±2.0 Å, c=13.0±2.0 Å, α=90.0°±5°, β=110.0°±10°, and γ=90.0° 5°.

4. The solid electrolyte material according to claim 1, wherein lattice parameters thereof are about a=12.0±1.0 Å, b=7.0±1.0 Å, c=12.0±1.0 Å, α=90.0°±5°, β=105°±5°, and γ=90.0°±5°.

5. The solid electrolyte material according to claim 1, wherein the material has diamond-like structural characteristics, coordination of M$^{3+}$ and M'$^{4+}$ in a structure with S$^{2-}$ forms tetrahedrons [MS$_4$] and [M'S$_4$], all corner-sharing tetrahedrons are connected, and Li$^+$ is filled in a gap between tetrahedrons.

6. The solid electrolyte material according to claim 1, wherein diffraction peaks occur at about 14.5°±3°, 15.5°±3°, 17°±3°, 25.5°±3°, 31.5°±3°, or 53.0°±3° in an XRD spectrogram.

7. The solid electrolyte material according to claim 2, wherein a Li$^+$ migration barrier thereof is no less than about 0.45 eV.

8. The solid electrolyte material according to claim 2, wherein a PBE band gap thereof is no less than about 2.80 eV.

9. An electrochemical device, comprising: a positive electrode, a negative electrode, and a solid electrolyte; the solid electrolyte comprises a solid electrolyte material, wherein a general chemical formula of the solid electrolyte material is $Li_{2+x}M_{2+x}M'_{1-x}S_6$, where M is at least one of Al, Ga or In, M' is at least one of Si or Ge, and $0<x\leq0.5$.

10. The electrochemical device according to claim 9, wherein M is Al and M' is Si.

11. An electronic device, comprising the electrochemical device according to claim 9.

12. The solid electrolyte material according to claim 2, wherein the material has diamond-like structural characteristics, coordination of M$^{3+}$ and M'$^{4+}$ in a structure with S$^{2-}$ forms tetrahedrons [MS$_4$] and [M'S$_4$], all corner-sharing tetrahedrons are connected, and Li$^+$ is filled in a gap between tetrahedrons.

<div style="text-align:center">* * * * *</div>